United States Patent
Hori et al.

(10) Patent No.: US 9,358,638 B2
(45) Date of Patent: Jun. 7, 2016

(54) MOVABLE VACUUM WELDING DEVICE

(71) Applicant: MITSUBISHI HEAVY INDUSTRIES, LTD., Tokyo (JP)

(72) Inventors: Takumi Hori, Tokyo (JP); Yasuyuki Fujiya, Tokyo (JP); Takehisa Okuda, Tokyo (JP); Osamu Hasegawa, Tokyo (JP); Katsuya Sennyu, Tokyo (JP); Masao Watanabe, Tokyo (JP); Takaaki Kaikogi, Tokyo (JP)

(73) Assignee: MITSUBISHI HEAVY INDUSTRIES MACHINE TOOL CO., LTD., Ritto-Shi (JP)

( * ) Notice: Subject to any disclaimer, the term of this patent is extended or adjusted under 35 U.S.C. 154(b) by 0 days.

(21) Appl. No.: 14/428,256

(22) PCT Filed: Jul. 26, 2013

(86) PCT No.: PCT/JP2013/070322
§ 371 (c)(1),
(2) Date: Mar. 13, 2015

(87) PCT Pub. No.: WO2014/045715
PCT Pub. Date: Mar. 27, 2014

(65) Prior Publication Data
US 2015/0258633 A1    Sep. 17, 2015

(30) Foreign Application Priority Data

Sep. 18, 2012  (JP) .................................. 2012-204689

(51) Int. Cl.
*B23K 31/02*    (2006.01)
*B23K 37/00*    (2006.01)
(Continued)

(52) U.S. Cl.
CPC ............. *B23K 26/122* (2013.01); *B23K 15/006* (2013.01); *B23K 15/04* (2013.01);
(Continued)

(58) Field of Classification Search
None
See application file for complete search history.

(56) References Cited

U.S. PATENT DOCUMENTS 3,136,882 A * 6/1964 Radtke ................... B23K 15/06
                                                      164/5 DIG
3,360,629 A * 12/1967 Bridoux ................. B23K 9/162
                                                      219/72
(Continued)

FOREIGN PATENT DOCUMENTS

EP          0106510 A2    4/1984
JP         55112187 A  *  8/1980
(Continued)

OTHER PUBLICATIONS

Machine tranlsation of JP 06269956 A (no date available).*
(Continued)

*Primary Examiner* — Kiley Stoner
(74) *Attorney, Agent, or Firm* — Birch, Stewart, Kolasch & Birch, LLP

(57) ABSTRACT

A movable vacuum welding device (1) includes a vacuum chamber (7) having an edge section (12) opposite to a surface of a welding target (T) and forming a vacuum space between the surface of the welding target (T) and the vacuum chamber (7), a seal section (8) interposed between the edge section (12) and the welding target (T) throughout the entire circumference of the edge section (12), a welding head (9) configured to perform welding on the surface of the welding target (T) in the vacuum space, and a preload unit (10) configured to previously apply a load to the seal section (8). The seal section (8) includes a first seal member (27) formed of an elastic material and extending along the edge section (12), and a second seal member (28) disposed at least a rear side in a relative moving direction in which a welding bead (W) passes and having higher flexibility than the first seal member (27).

16 Claims, 11 Drawing Sheets

(51) Int. Cl.
*B23K 26/12* (2014.01)
*B23K 26/24* (2014.01)
*B23K 15/06* (2006.01)
*B23K 15/00* (2006.01)
*B23K 15/04* (2006.01)

(52) U.S. Cl.
CPC .............. *B23K 15/06* (2013.01); *B23K 26/127* (2013.01); *B23K 26/1224* (2015.10); *B23K 26/1462* (2015.10); *B23K 26/24* (2013.01); *B23K 26/282* (2015.10); *B23K 2201/06* (2013.01); *B23K 2203/04* (2013.01)

(56) References Cited

U.S. PATENT DOCUMENTS

| | | | | |
|---|---|---|---|---|
| 3,529,123 A * | 9/1970 | Hinrichs | ................ | B23K 15/02 219/121.13 |
| 3,535,489 A * | 10/1970 | Hinrichs | ................ | B23K 15/06 219/121.13 |
| 3,601,248 A * | 8/1971 | Gerard | .................... | H01J 37/18 198/866 |
| 3,609,287 A * | 9/1971 | Hinrichs | ............... | H01J 37/315 219/121.14 |
| 3,688,075 A * | 8/1972 | Cupler, II | ................ | B23K 15/08 219/121.12 |
| 3,702,389 A * | 11/1972 | Peyrot | .................... | B23K 15/06 219/121.13 |
| 3,719,791 A * | 3/1973 | Peyrot | ................ | H01J 37/18 219/121.13 |
| 3,806,693 A * | 4/1974 | Miller | .................... | B23K 15/04 219/121.13 |
| 4,034,182 A * | 7/1977 | Schlosser | ........... | B23K 15/0006 219/121.14 |
| 4,072,844 A * | 2/1978 | Sayegh | ................. | B23K 15/08 219/121.21 |
| 4,080,526 A * | 3/1978 | Kihara | ................. | H01J 37/301 219/121.21 |
| 4,162,391 A * | 7/1979 | Sciaky | .................... | H01J 37/18 219/121.13 |
| 4,342,900 A * | 8/1982 | Susei | ...................... | H01J 37/30 219/121.13 |
| 4,482,796 A * | 11/1984 | Weissmann | ............ | B23K 15/06 219/121.13 |
| 4,607,167 A * | 8/1986 | Petric | .................... | B82Y 10/00 219/121.22 |
| 6,011,240 A * | 1/2000 | Bishop | .................. | B23K 26/26 219/121.11 |
| 6,530,317 B2 * | 3/2003 | Gelbart | ..................... | B41C 1/05 101/31.1 |
| 6,737,660 B2 * | 5/2004 | Miura | ..................... | H01J 37/18 219/121.22 |
| 8,829,388 B2 * | 9/2014 | Samartsev | ........... | B23K 26/023 219/121.63 |
| 2002/0121504 A1 * | 9/2002 | Miura | .................... | B23K 15/10 219/121.22 |

FOREIGN PATENT DOCUMENTS

| | | | |
|---|---|---|---|
| JP | 59-5076 B | | 2/1984 |
| JP | 61007080 A | * | 1/1986 |
| JP | 3-47670 U | | 5/1991 |
| JP | 03155480 A | * | 7/1991 |
| JP | 06269956 A | * | 9/1994 |
| JP | 7-29881 A | | 1/1995 |
| JP | 7-13912 Y2 | | 4/1995 |
| JP | 2001-47254 A | | 2/2001 |
| JP | 2012149761 A | * | 8/2012 |
| KR | 100790776 B1 | * | 1/2008 |
| WO | WO 03/068444 A1 | | 8/2003 |

OTHER PUBLICATIONS

International Search Report mailed Oct. 8, 2013 issued in related Application No. PCT/JP2013/070322 with an English translation.
Written Opinion mailed Oct. 8, 2013 issued in related Application No. PCT/JP2013/070322 with an English translation.

* cited by examiner

MOVABLE VACUUM WELDING DEVICE

TECHNICAL FIELD

The present invention relates to a movable vacuum welding device configured to perform welding while relatively moving a welding target and a welding head.

Priority is claimed on Japanese Patent Application No. 2012-204689, filed Sep. 18, 2012, the content of which is incorporated herein by reference.

BACKGROUND ART

In the related art, for example, when a flat plate-shaped welding target is welded, a stationary vacuum welding device configured to cover the entire welding target with a vacuum chamber and form a vacuum environment by vacuum-suctioning the vacuum chamber is known. However, when the welding target such as a compression container or the like is large, the vacuum chamber and the vacuum pump may be increased in size, and an enormous equipment cost and a wide installation space may be needed.

As a welding device corresponding to a large welding target, a movable vacuum welding device configured to move a vacuum chamber is known (for example, see Patent Literature 1). The welding device has a vacuum chamber that is relatively movable with respect to a welding target, and a seal section interposed between the vacuum chamber and the welding target, and maintains vacuum in the vacuum chamber as the seal section is adhered to the welding target.

CITATION LIST

Patent Literature

[Patent Literature 1] Japanese Utility Model Publication No. H07-13912

SUMMARY OF INVENTION

Technical Problem

However, when undulation of a welding bead formed at the welding target by performing the welding is large, leakage from the seal section may occur and it may be impossible to hold a vacuum level, making the welding difficult.

The present invention is directed to provide a movable vacuum welding device having a vacuum chamber and a seal section interposed between the vacuum chamber and a welding target, and that is capable of preventing a leakage from a seal unit and securing a vacuum in the vacuum chamber.

Solution to Problem (1) According to a first aspect of the present invention, a movable vacuum welding device includes a vacuum chamber having an edge section opposite to a surface of a welding target and forming a vacuum space between the surface of the welding target and the vacuum chamber; a seal section interposed between the edge section and the welding target throughout the entire circumference of the edge section; a welding head configured to perform welding on the surface of the welding target in the vacuum space; a moving unit configured to relatively move the welding target with respect to the vacuum chamber; and a preload unit configured to previously apply a load to the seal section, wherein the seal section includes: a first seal member formed of an elastic material and extending along the edge section; and a second seal member disposed at at least a rear side in the relative moving direction in which a welding bead passes, and having higher flexibility than the first seal member.

According to the above-mentioned configuration, when the welding bead passes through the second seal member, since the second seal member follows undulation of the welding bead, leakage from the seal section can be prevented, and a vacuum in the vacuum chamber can be secured.

(2) In the movable vacuum welding device disclosed in (1), a plurality of elastic members configured to bias the second seal member toward the welding target may be provided between the edge section and the second seal member in an extending direction of the second seal member.

According to the above-mentioned configuration, as the plurality of elastic members is formed, a contact surface pressure between the second seal member and the welding target can be equalized in an extending direction of the second seal member. Accordingly, followability of the second seal member with respect to the undulation of the welding bead can be improved.

(3) In the movable vacuum welding device disclosed in (2), a concave section corresponding to a shape of the welding bead may be formed immediately over the welding bead on a surface of the edge section facing the second seal member.

According to the above-mentioned configuration, even when the second seal member protrudes upward in a part of the second seal member in contact with the welding bead, since the protruding part is deformed to enter the concave section, the surface pressure applied to the second seal member immediately over the welding bead can be lowered. Accordingly, reduction in wear of the second seal member can be attempted.

(4) In the movable vacuum welding device disclosed in (2) or (3), a modulus of elasticity of the elastic member disposed immediately over the welding bead is reduced.

According to the above-mentioned configuration, the surface pressure applied to the second seal member immediately over the welding bead can be lowered. Accordingly, reduction in wear of the second seal member can be attempted.

(5) In the movable vacuum welding device disclosed any one of (1) to (4), the second seal member may be gland packing having a heat-resisting property.

According to the above-mentioned configuration, since a coefficient of friction of the gland packing is extremely small, a required driving force to relatively move the moving unit can be lowered, and a driving source of the moving unit configured to relatively move the welding target with respect to the vacuum chamber can be reduced in size and cost. In addition, a seal performance can be maintained for a long time, and followability to the welding bead having a high temperature and undulation becomes possible.

(6) In the movable vacuum welding device according to any one of (1) to (5), the welding head and the vacuum chamber may be connected via a movable sealing unit configured to movably support the welding head in a direction perpendicular to the surface of the welding target, and seal a space between the welding head and the vacuum chamber.

According to the above-mentioned configuration, as the distance between the welding head and the welding target is adjusted, even when wear occurs in the seal section, welding precision can be maintained.

(7) In the movable vacuum welding device disclosed in (6), the movable sealing unit may be a bellows formed of a metal.

(8) In the movable vacuum welding device disclosed in (6) or (7), the welding head may be supported by a guide section configured to constantly maintain a distance between the welding head and the welding target with respect to the welding target.

According to the above-mentioned configuration, even when the vacuum chamber approaches the welding target due to wear of the seal section, since the distance between the welding head and the welding target is maintained constant, welding precision can be maintained.

Advantageous Effects of Invention

According to the movable vacuum welding device in accordance with the above-mentioned aspects of the present invention, when the welding bead passes the second seal member, since the second seal member follows the undulation of the welding bead, leakage from the seal section can be prevented, and a vacuum in the vacuum chamber can be secured.

DETAILED DESCRIPTION OF EMBODIMENTS (First Embodiment)

Hereinafter, an embodiment of the present invention will be described in detail with reference to the accompanying drawings.

Figure 1:
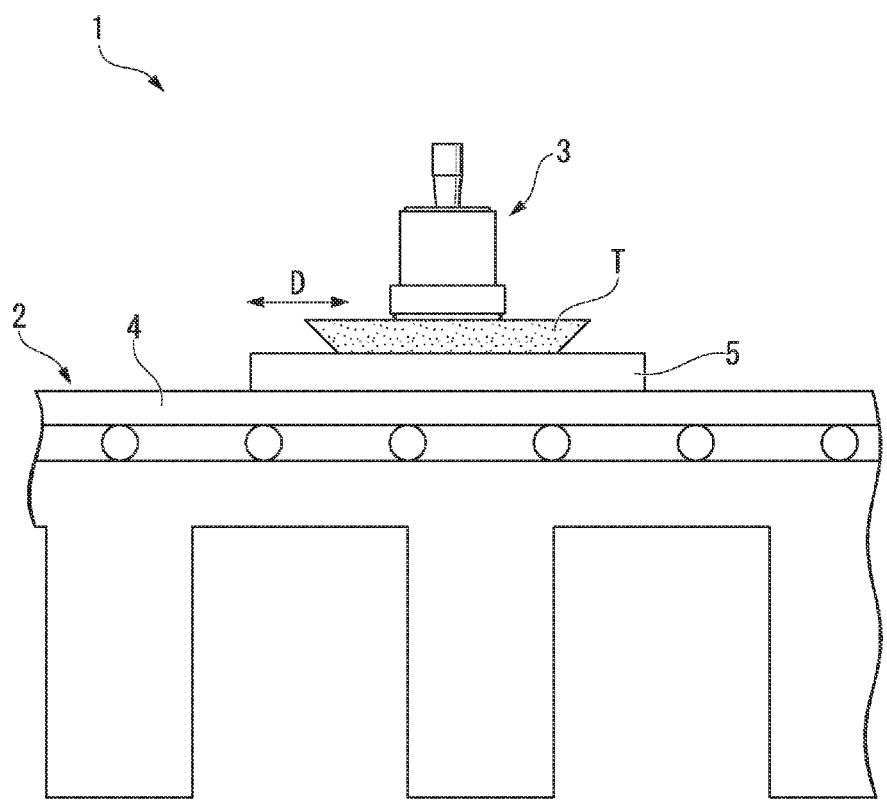
FIG. 1 is a schematic configuration view of a movable vacuum welding device according to a first embodiment of the present invention.

As shown in FIG. 1, a movable vacuum welding device 1 of the embodiment has a line conveyor 2 (a moving unit) configured to move a flat plate-shaped welding target T, and a local vacuum type laser device 3. The welding target T is placed on a pallet 5 configured to move on a line 4 of the line conveyor 2. Accordingly, the welding target T is relatively moved with respect to the local vacuum type laser device 3. Hereinafter, a direction of the relative movement is simply referred to as a moving direction D.

Figure 2:
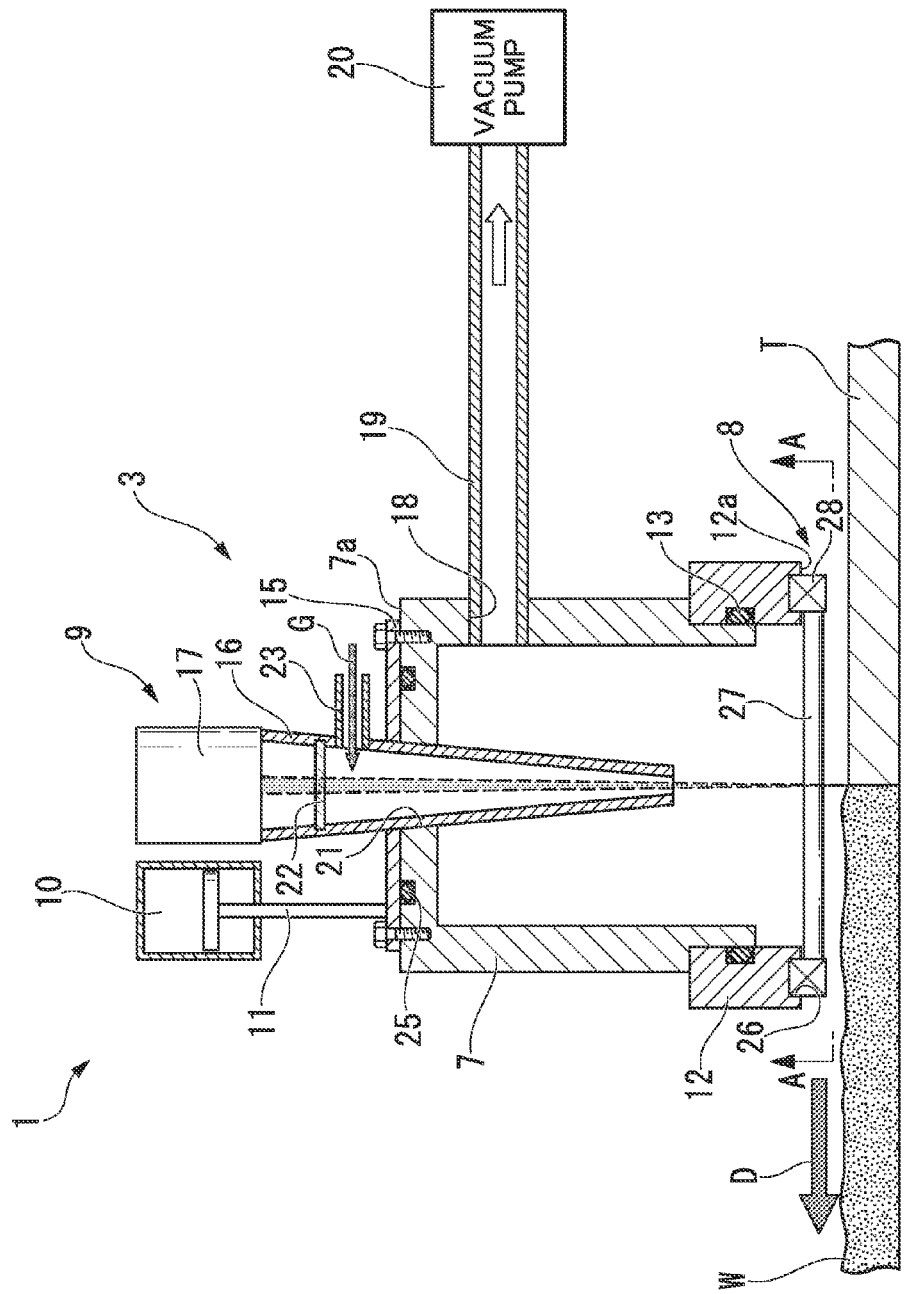
FIG. 2 is a schematic configuration view of a local vacuum type laser device according to the first embodiment of the present invention.

As shown in FIG. 2, the local vacuum type laser device 3 has a vacuum chamber 7 forming a rectangular parallelepiped shape having a surface opened opposite to a surface of the welding target T and in which a seal section 8 is formed at the opening section, a welding head 9 formed at an upper surface 7a serving as an opposite surface of the opening section of the vacuum chamber 7, and an actuator 10 configured to apply a preload to the seal section 8.

The vacuum chamber 7 is a container that forms a vacuum space with a surface of the welding target T, and as described above, forms a rectangular parallelepiped shape having a surface opened opposite to the welding target T. A frame-shaped holder 12 (an edge section) is attached to the opening section of the vacuum chamber 7 via a first sealing member 13 such as an O-ring or the like. The seal section 8 is formed throughout the entire circumference at four sides opposite to the welding target T of the holder 12.

In addition, the vacuum chamber 7 is disposed such that a longitudinal direction of two opposite sides of one side of the holder 12 is in a moving direction, and two sides of the other side cross over a welding part.

The welding head 9 is a device for performing welding on a surface of the welding target T in the vacuum space, and has a plate-shaped base section 15, a nozzle section 16 attached to pass through the base section 15, and a laser head 17 attached to a base end section (an upper side of FIG. 2) of the nozzle section 16 opposite to a front end.

The laser head 17 is an emissive optical unit of a laser, and the nozzle section 16 is formed in a conical shape matched to a trajectory of a laser beam. The base section 15 is a member configured to fix the nozzle section 16 to a chamber main body, and attached to the upper surface 7a of the vacuum chamber 7 via a second sealing member 25. A lens 22 is attached to a base end of the nozzle section 16.

In addition, a lens shielding gas G is introduced into the nozzle section 16 via a gas introduction pipe 23 installed at a side section of the nozzle section 16. The nozzle section 16 is a nozzle configured to prevent metal vapor generated from a welding portion from attaching to the lens 22 or the like.

An exhaust hole 18 is formed at one side section of the vacuum chamber 7, and a vacuum pump 20 (a vacuum exhaust device) is connected to the exhaust hole 18 via an exhaust pipe 19. In addition, a nozzle insertion hole 21 into which the nozzle section 16 is inserted is formed in the upper surface 7a of the vacuum chamber 7.

The holder 12 has a quadrangular frame shape, and a concave groove 26 into which the seal section 8 is fitted is formed in a lower surface 12a of the holder 12 facing the welding target T.

The actuator 10 is a hydraulic cylinder, and functions as a preload unit configured to apply a preload necessary for a seal to the seal section 8 by pressing a rod 11 against the upper surface 7a of the vacuum chamber 7. That is, the load is previously applied to the seal section 8 by the actuator 10.

Further, the actuator 10 is not limited to the hydraulic cylinder but a pneumatic cylinder, an electric cylinder, a rotary screw mechanism, or the like may be employed as long as the preload necessary for the seal section 8 can be applied.

Figure 3:
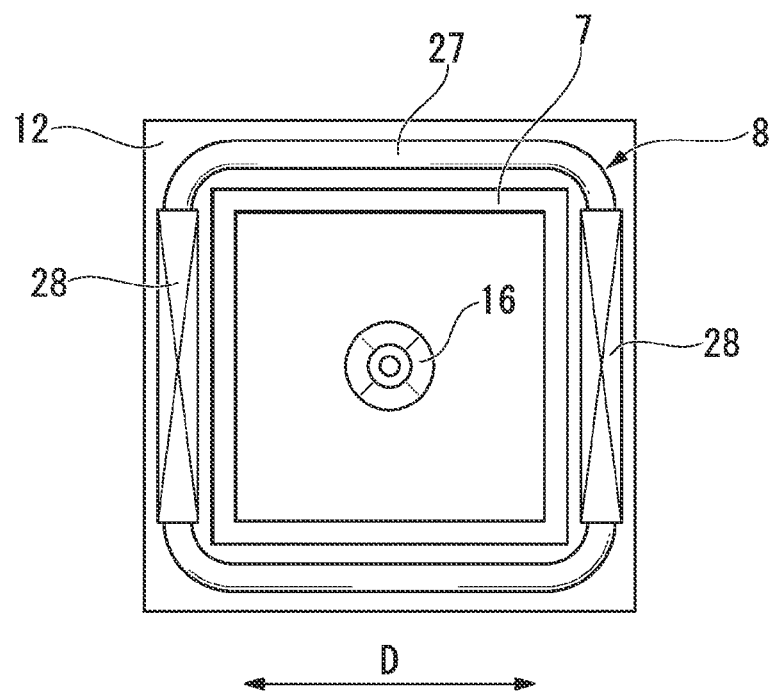
FIG. 3 is a view taken along line A-A of FIG. 2.

As shown in FIG. 3, the seal section 8 is a sealing material interposed between the holder 12 and the welding target T throughout the entire circumference of the holder 12, and has first seal members 27 formed of an elastic material and extending along four sides of the holder 12, and second seal members 28 installed at two sides of the four sides of the holder 12 passing through the welding part. In other words, the first seal members 27 are installed at two sides of the four sides opposite to the surface of the welding target T of the vacuum chamber 7 in the moving direction D, and the second seal members 28 are installed at two sides perpendicular to the moving direction D.

Further, the second seal member 28 may be configured to be installed at only at least a rear side in the moving direction in which a welding bead W formed by welding passes, and need not be installed at both sides perpendicular to the moving direction D.

The first seal member 27 is non-metal type squeeze packing (a rubber gasket), and specifically, the first seal member 27 of the embodiment is an O-ring formed of silicone rubber. In addition, vacuum grease is applied on an abutting section of the first seal member 27 with the welding target T to reduce frictional resistance against the welding target T. Further, the first seal member 27 is not limited to the O-ring but non-metal type squeeze packing such as an X-ring, a D-ring, a T-ring, and so on may be employed.

The second seal member 28 is a seal member having higher flexibility than the first seal member 27, and the second seal member 28 of the embodiment is gland packing having a heat-resisting property. For example, as the gland packing, a structure obtained by braiding graphite fibers (braided packing), a structure obtained by stacking graphite fibers, or a roll winding structure (stack form packing) may be employed. The gland packing of the embodiment is obtained by processing the packing with a special lubricant.

For example, the gland packing has followability with respect to the undulation of the welding bead W having a height of 3 mm, and a heat resistant temperature of the gland packing is 200° C. to 600° C. In addition, a material constituting the gland packing is not limited to the graphite fiber but a carbon fiber may be employed.

Figure 4:
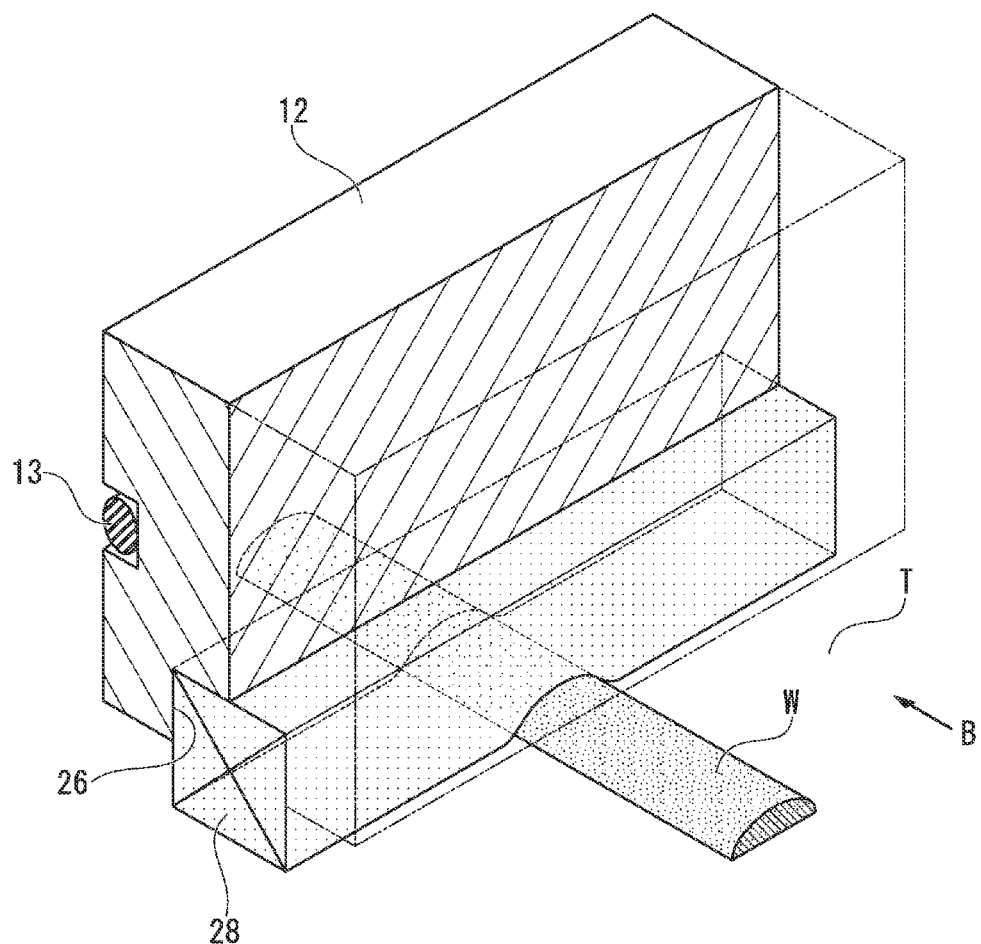
FIG. 4 is a perspective view of a holder and a second seal member according to the first embodiment of the present invention.

As shown in FIG. 4, the second seal member 28 has a quadrangular cross-section, and the concave groove 26 has a shape corresponding to the second seal member 28.

Next, an action of the movable vacuum welding device 1 of the embodiment will be described.

First, focusing is performed such that a focus of a laser beam coincides with a welding part of the welding target T in a state in which the preload is applied to the seal section 8 by the actuator 10. Next, after the preload is applied to cause the vacuum chamber 7 to abut the welding part of the welding target T at the welding position, surroundings of the welding position in the vacuum chamber 7 become a vacuum environment through vacuum suction by the vacuum pump 20.

Figure 5:
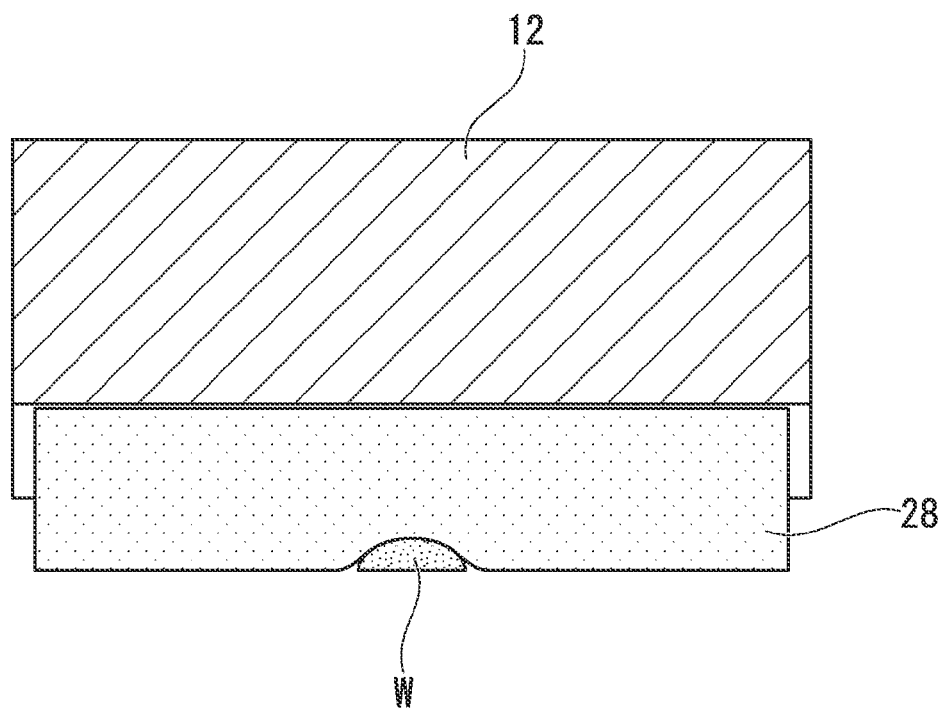
FIG. 5 is a view when seen from an arrow B of FIG. 4.

Next, the laser beam is emitted by the laser head 17 to perform the welding of the welding target T. Here, a predetermined driving means of the line conveyor 2 is operated, and the welding target T is relatively moved with respect to the local vacuum type laser device 3. Here, as shown in FIG. 5, the second seal member 28 deforms to follow the undulation (shape) of the welding bead W.

According to the embodiment, as the second seal member 28 deforms to follow the undulation of the welding bead W, leakage from the seal section 8 can be prevented, and a vacuum in the vacuum chamber 7 can be secured.

In addition, since a coefficient of friction of the gland packing is extremely small, a demand driving force of the line conveyor 2 can be lowered. That is, a driving source of the line conveyor 2 configured to relatively move the welding target T with respect to the vacuum chamber 7 can be reduced in size and cost. In addition, the seal performance can be maintained for a long time, and followability to the welding bead W having a high temperature and undulation becomes possible.

In addition, in the two sides in the moving direction of the four sides opposite to the surface of the welding target T of the vacuum chamber 7, the sealing can be performed by the first seal member 27 having lower flexibility than the second seal member 28 due to a small increase in temperature caused by separation from the welding bead W, and the small undulation.

In addition, as the O-ring configured to apply the vacuum grease is employed as the first seal member 27, for example, since the coefficient of friction is smaller than that of the gasket, the driving force of the line conveyor 2 required for relative movement of the welding target T can be reduced.

(Second Embodiment)

Figure 6:
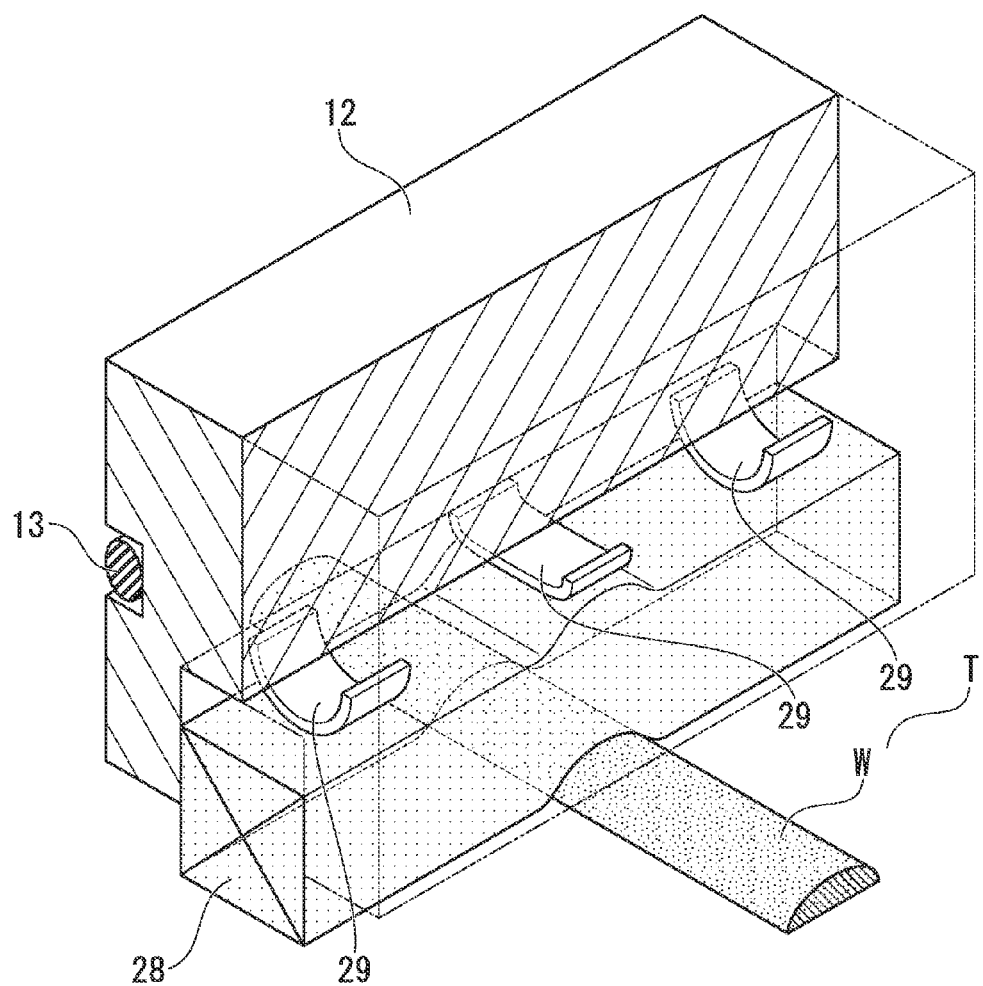
FIG. 6 is a perspective view of a holder and a second seal member according to a second embodiment of the present invention.

Next, a movable vacuum welding device according to a second embodiment of the present invention will be described. FIG. 6 is a perspective view showing a holder 12 and a second seal member 28 according to the second embodiment of the present invention. Further, in each of the embodiments described below, differences from the above-mentioned first embodiment will be mainly described, and description of the same components will be omitted.

A characteristic of the holder 12 and the second seal member 28 according to the embodiment is that a flat spring 29 serving as an elastic member is interposed between the second seal member 28 and the holder 12.

Specifically, as shown in FIG. 6, the plurality of (in the embodiment, three) flat springs 29 are installed at equal intervals in a longitudinal direction of the second seal member 28. The flat spring 29 is formed of a single rectangular metal plate, and is installed so that the second seal member 28 is biased downward with respect to the holder 12, i.e., in a direction toward the welding target T.

In addition, preferably, in the plurality of flat springs 29, a modulus of elasticity of the flat spring 29 disposed immediately above the welding bead W is reduced. That is, the flat spring 29 facing the welding bead W portion is formed to be reduced in thickness.

Further, the elastic member is not limited to the flat spring 29 but a disc spring, a compressive coil spring, or the like may be employed.

According to the above-mentioned embodiment, as the plurality of flat springs 29 are installed between the holder 12 and the second seal member 28, a contact surface pressure between the second seal member 28 and the welding target T can become equal in an extension direction of the second seal member 28. Accordingly, followability with respect to the undulation of the welding bead W of the second seal member 28 can be improved.

In addition, in the plurality of flat springs 29, when the modulus of elasticity of the flat spring 29 disposed immediately over the welding bead W is reduced, a surface pressure applied to the second seal member 28 immediately over the welding bead W can be decreased. Accordingly, reduction in wear of the second seal member 28 can be attempted.

(Third Embodiment)

Next, a movable vacuum welding device according to a third embodiment of the present invention will be described. A characteristic of the embodiment is that a concave section 30 is formed at a surface 26a of the concave groove 26 of the holder 12 opposite to the second seal member 28.

Figure 7:
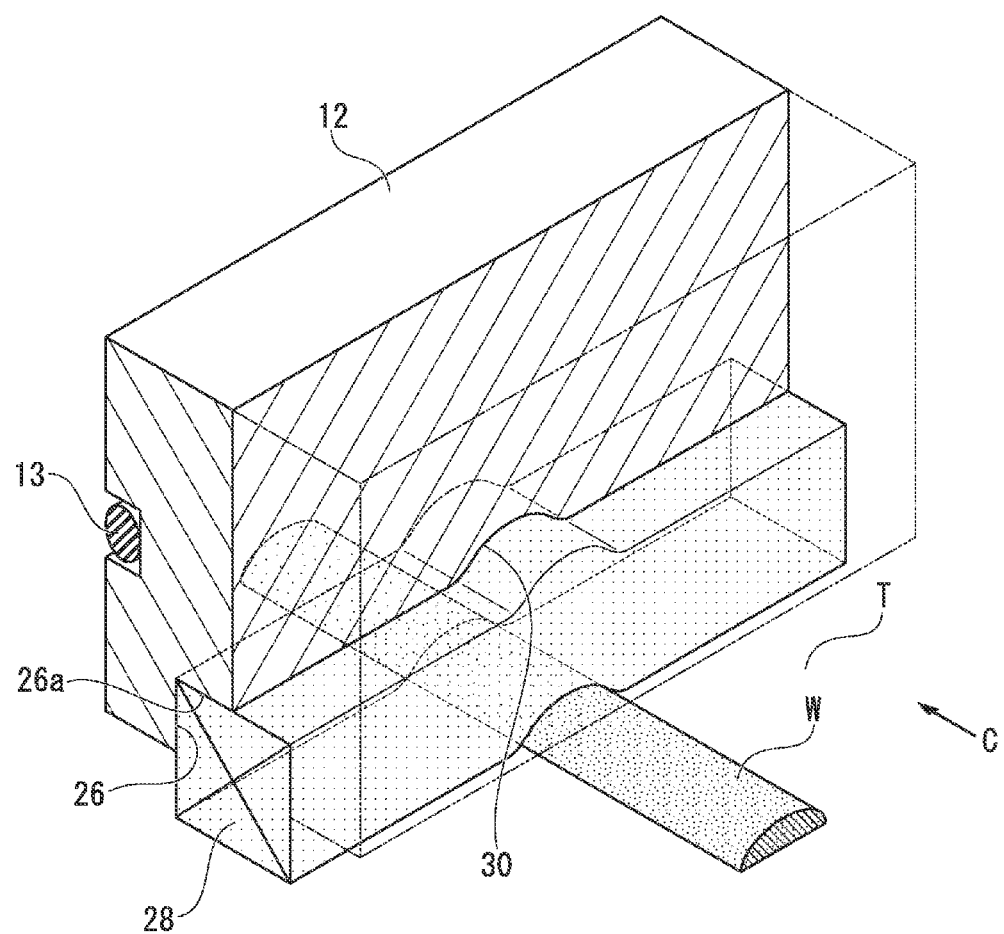
FIG. 7 is a perspective view of a holder and a second seal member according to a third embodiment of the present invention.

Specifically, as shown in FIG. 7, the concave section 30 is formed immediately over the welding bead W. The concave section 30 is formed to have a cross-sectional shape conforming to the shape of the welding bead W. For example, when the shape of the welding bead W is a chevron shape having a smooth convex shape at its upper side, the concave section 30 has a smooth concave shape disposed higher than the surface 26a of the concave groove 26 opposite to the second seal member 28.

Figure 8:
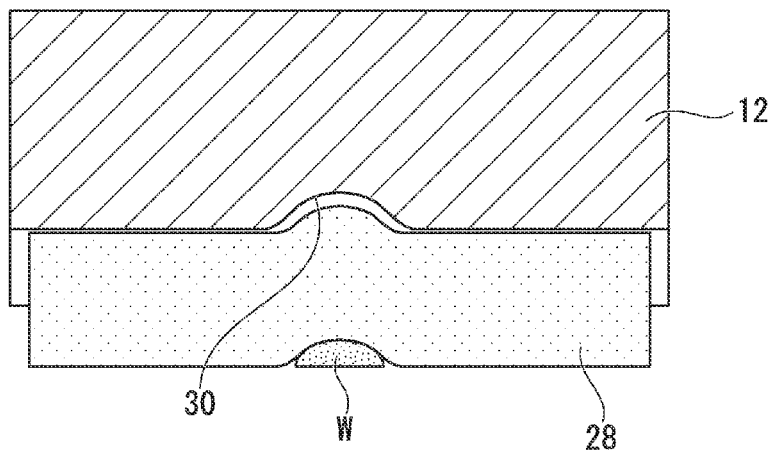
FIG. 8 is a view when seen from an arrow C of FIG. 7.

According to the embodiment, as shown in FIG. 8, even when the upper side of the second seal member 28 protrudes upward in the part of the second seal member 28 in contact with the welding bead W, since the protruding part is deformed to enter the concave section 30, the surface pressure applied to the second seal member 28 immediately over the welding bead W can be lowered. Accordingly, reduction in wear of the second seal member 28 can be attempted.

Figure 9:
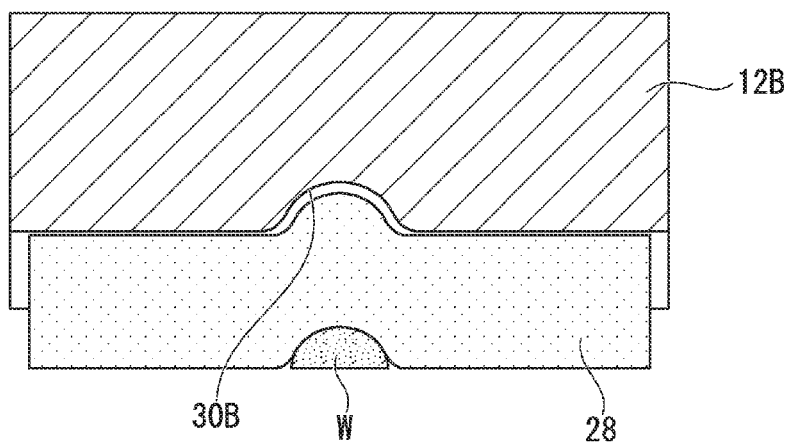
FIG. 9 is a view when seen from the arrow C of FIG. 7, showing a concave section corresponding to a larger welding bead.

Further, while the shape of the concave section 30 of the embodiment corresponds to the size of the welding bead W, the plurality of holders 12 having different shapes of the concave section 30 can be prepared, and the holders 12 can also be modified to match the shape of the welding bead W. FIG. 9 shows a holder 12B having a concave section 30B corresponding to a welding bead W2 larger than that of FIG. 8.

(Fourth Embodiment)

Next, a movable vacuum welding device 1D according to a fourth embodiment of the present invention will be described.

Figure 10:
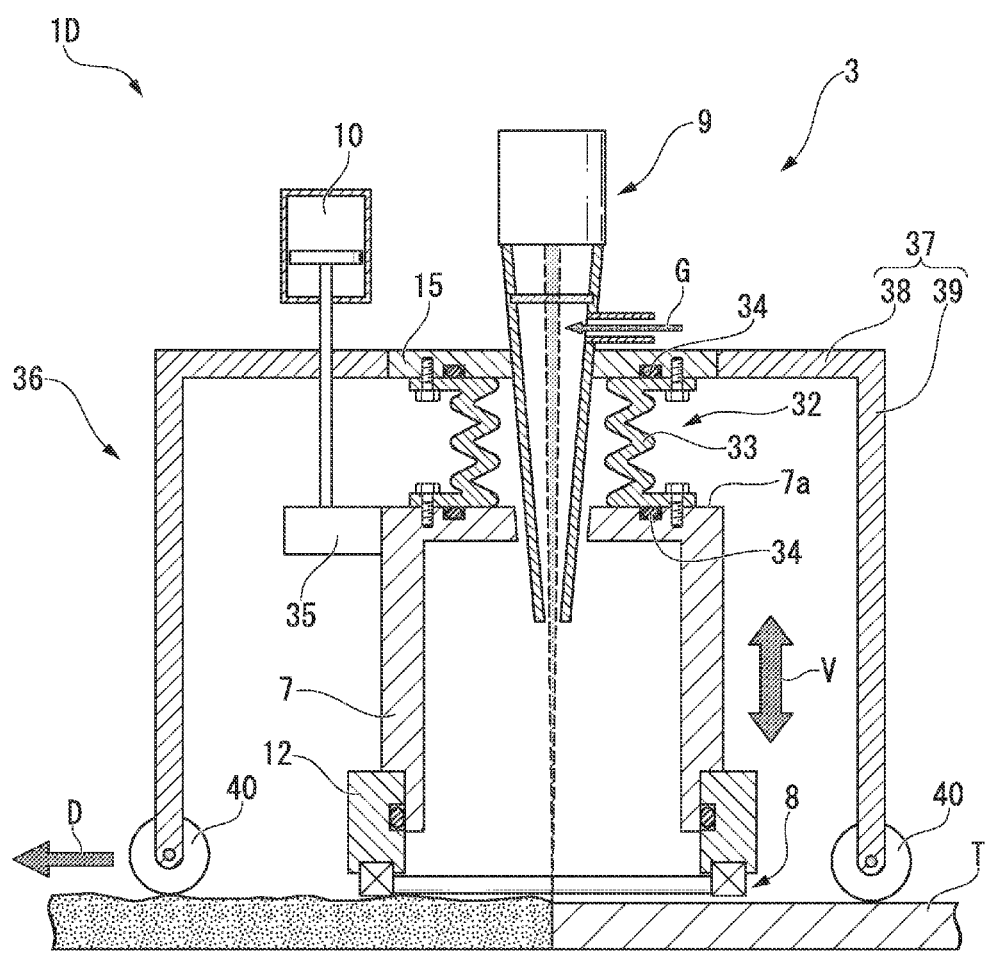
FIG. 10 is a schematic configuration view of a local vacuum type laser device according to a fourth embodiment of the present invention.

As shown in FIG. 10, the vacuum chamber 7 and the welding head 9 of the local vacuum type laser device 3 of the embodiment are connected via a movable sealing unit 32 configured to movably support the welding head 9 in a direction V perpendicular to the surface of the welding target T, and seal a space between the welding head 9 and the vacuum chamber 7. The movable sealing unit 32 has a bellows 33 (a boot) formed of a metal, and third sealing members 34 interposed between the bellows 33 and the base section 15 of the welding head 9, and between the bellows 33 and the upper surface 7a of the vacuum chamber 7.

The bellows 33 is a cylindrical member in which a circumferential surface is formed in a bellows shape, and a distance between one end section and the other end section is variable. One side of the bellows 33 is connected to the lower surface of the base section 15 of the welding head 9 via the third sealing member 34, and the other side is connected to the upper surface 7a of the vacuum chamber 7 via the third sealing member 34. That is, the sealing is provided such that air-tightness of the vacuum chamber 7 is not damaged due to the bellows 33.

The actuator 10 is disposed to press an extension section 35 attached to the vacuum chamber 7. That is, only the vacuum chamber 7 is configured to be pressed against the surface of the welding target T.

In addition, the welding head 9 is supported by a guide section 36 configured to constantly maintain the distance between the welding head 9 and the welding target T with respect to the welding target T. The guide section 36 is constituted by an arm section 37 and a roller bearing 40 such as a roller follower or the like attached to an end section of a lower side of the arm section 37.

The arm section 37 is constituted by a parallel section 38 extending in parallel to the surface of the welding target T, and a vertical section 39 extending downward from an end section of the parallel section 38. The roller bearing 40 is attached to a lower end of the vertical section 39. The guide section 36 has a dimension such that a distance between the laser head 17 and the welding target T becomes optimal. That is, even when the vacuum chamber 7 approaches the welding target T due to the wear of the seal section 8, the distance between the laser head 17 and the welding target T is maintained constant.

According to the above-mentioned embodiment, even when the vacuum chamber 7 approaches the welding target T due to the wear of the seal section 8, since the distance between the laser head 17 and the welding target T is maintained constant, finish of the welding bead W can be improved.

Further, in the above-mentioned embodiment, while the distance between the laser head 17 and the welding target T is maintained constant using the guide section 36, the guide section 36 can be omitted by appropriately modifying the distance between the laser head 17 and the welding target T according to the wear of the seal section 8, or the like.

Figure 11:
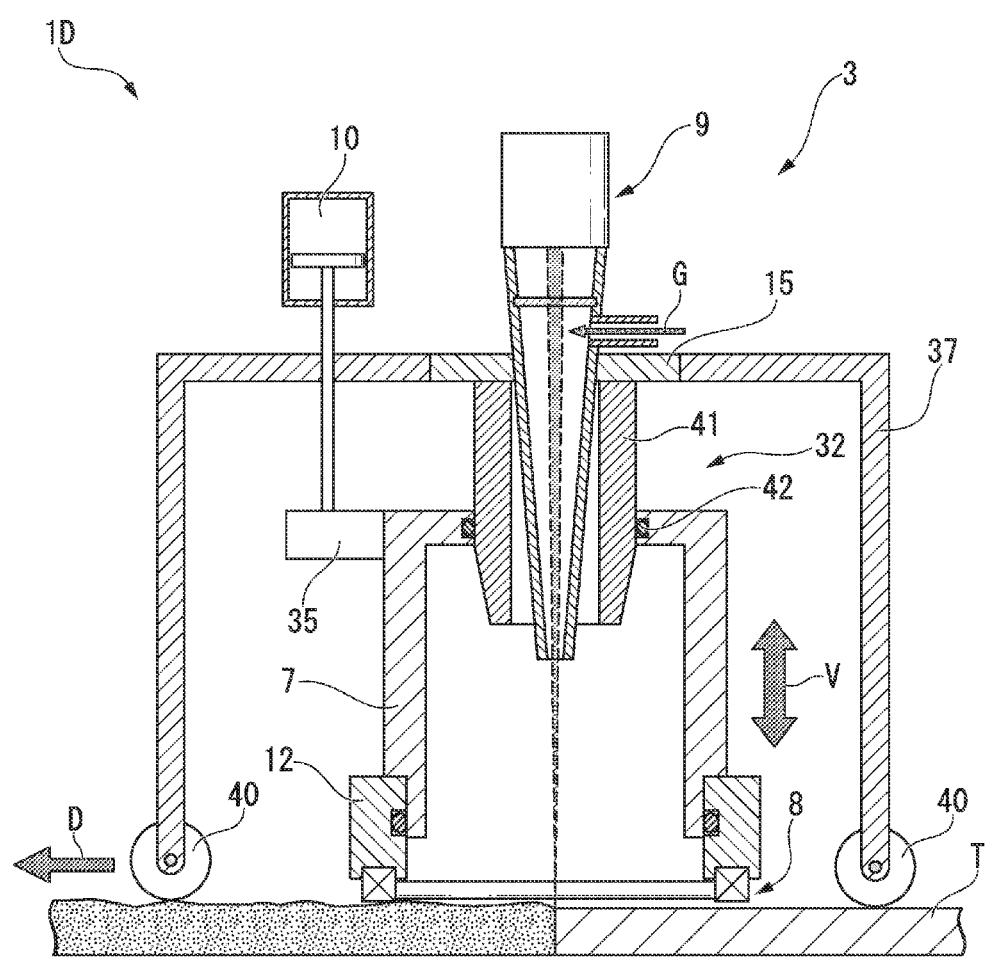
FIG. 11 is a schematic configuration view of a local vacuum type laser device according to a modified example of the fourth embodiment of the present invention.

In addition, as the movable sealing unit 32, for example, a cylindrical case 41 as shown in FIG. 11 can be employed as well as the bellows 33. The cylindrical case 41 is formed of, for example, a metal, and an upper end thereof is adhered to the lower surface of the base section 15 of the welding head 9 by welding or the like. An outer circumferential surface of the cylindrical case 41 is slidable on a fourth sealing member 42 installed at an inner circumferential surface of the nozzle insertion hole 21, and thus a vacuum in the vacuum chamber 7 is maintained.

(Fifth Embodiment)

Next, a movable vacuum welding device 1E of a fifth embodiment of the present invention will be described.

Figure 12:
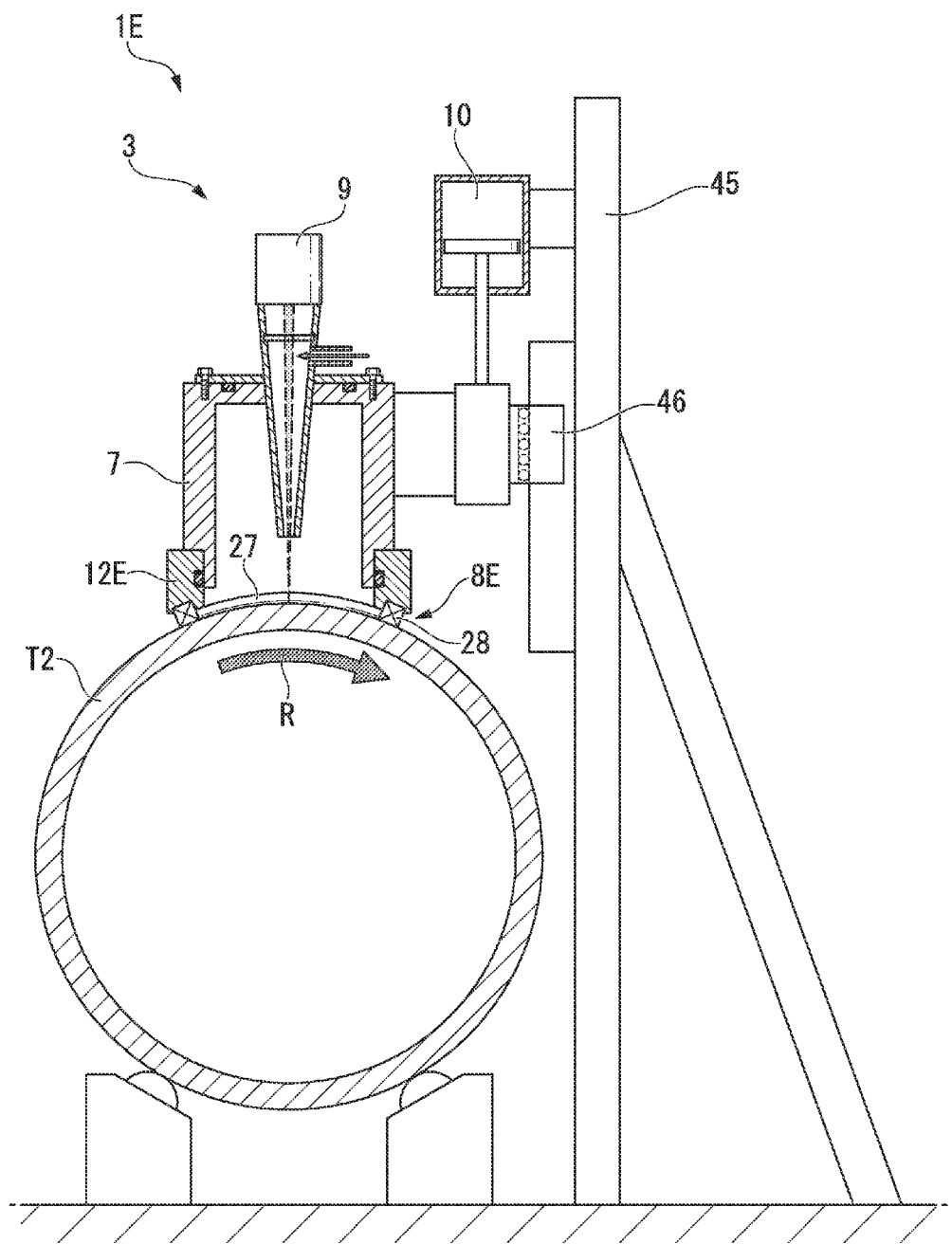
FIG. 12 is a schematic configuration view of a movable vacuum welding device according to a fifth embodiment of the present invention.

As shown in FIG. 12, the movable vacuum welding device 1E of the embodiment is characterized in that a cylindrical second welding target T2 is welded, whereas the movable vacuum welding device of the first embodiment to the fourth embodiment welds the flat plate-shaped welding target T.

The second welding target T2 is axially rotatably supported by a predetermined support means. That is, the second welding target T2 is rotatable in an arrow direction (a rotational direction R) of FIG. 12.

The vacuum chamber 7 of the movable vacuum welding device 1E of the embodiment is supported with respect to a base section 45 serving as a base of the device via the linear guide 46 (a linear motion guide), and freely approaches or is separated from the second welding target T2 in a normal direction of the second welding target T2.

In addition, the actuator 10 is attached to the base section 45 and configured to preload the seal section 8E.

A holder 12E and a seal section 8E of the movable vacuum welding device 1E of the embodiment are formed along a cylindrical surface of the second welding target T2. Specifically, among four sides of the holder 12E, two sides passing through the welding part and extending in a direction perpendicular to the rotational direction R are linearly formed, and the second seal members 28 are attached to the two sides. In addition, the two sides in the rotational direction R are formed in shapes along an arc shape of the outer circumferential surface of the second welding target T2, and the first seal members 27 are attached to the two sides. That is, the first seal member 27 extends in the rotational direction R and is curved in an arc shape to be fixed to the holder 12E along the outer circumferential surface of the second welding target T2.

Upon welding using the movable vacuum welding device 1E of the embodiment, the second welding target T2 is rotated by a predetermined support means, and vacuum suction is performed after the preload is applied to the seal section 8E by the actuator 10.

According to the above-mentioned embodiment, as the holder 12 is formed in a shape along an outer circumferential surface of a cylindrical second welding target T2, the movable vacuum welding device 1E may be welded to a cylindrical welding target as well as a flat plate-shaped welding target.

Further, the technical scope of the present invention is not limited to the above-mentioned embodiments but various modifications may be made without departing from the scope of the present invention. In addition, the plurality of embodiments may be combined within a range in which contents thereof are not inconsistent.

For example, in the above-mentioned embodiments, while the gland packing is employed as the second seal member 28, the gland packing is not limited thereto but for example, a brush seal formed of a metal such as SUS 304 or the like may be employed. In addition, packing constituted by a core formed of a stainless steel wire having a mesh structure and a sleeve formed of a heat-resistant glass fiber, or packing constituted by a core formed of a stainless steel wire having a mesh structure and a sleeve formed of SUS or Inconel may also be employed.

In addition, in the above-mentioned embodiments, while an example in which the seal section 8 is applied to the vacuum chamber 7 of the laser welding device is described, the present invention can also be applied to an electron beam welding device with no problem.

In addition, the above-mentioned embodiments may be appropriately combined. For example, the seal section 8E of the fifth embodiment and the flat spring 29 of the second embodiment may be combined. Accordingly, the surface pressure applied to the second seal member 28 can be lowered.

INDUSTRIAL APPLICABILITY

In the above-mentioned movable vacuum welding device, when the welding bead passes through the second seal member, since the second seal member follows the undulation of the welding bead, leakage from the seal section can be prevented, and a vacuum in the vacuum chamber can be secured.

REFERENCE SIGNS LIST

1 movable vacuum welding device
2 line conveyor (moving unit)
3 local vacuum type laser device
7 vacuum chamber
8 seal section
9 welding head
10 actuator (preload unit)
11 rod
12 holder (edge section)
13 first sealing member
15 base section
16 nozzle section
17 laser head
25 second sealing member
26 concave groove
27 first seal member
28 second seal member
29 flat spring
30 concave section
32 movable sealing unit
33 bellows
34 third sealing member
35 extension section
36 guide section
37 arm section
38 parallel section
39 vertical section
40 roller bearing
41 cylindrical case
42 fourth sealing member
T, T2 welding target
W welding bead

The invention claimed is:

1. A movable vacuum welding device comprising:
a vacuum chamber having an edge section opposite to a surface of a welding target and forming a vacuum space between the surface of the welding target and the vacuum chamber;
a seal section interposed between the edge section and the welding target throughout the entire circumference of the edge section;
a welding head configured to perform welding on the surface of the welding target in the vacuum space;
a moving unit configured to move the welding target with respect to the vacuum chamber; and
a preload unit configured to previously apply a load to the seal section,
wherein the welding target is moved and the vacuum chamber is stationary so that the welding target moves with respect to the vacuum chamber,
wherein the seal section includes:
a first seal member formed of an elastic material and extending along the edge section; and
a second seal member disposed at least a rear side in the relative moving direction in which a welding bead passes, and having higher flexibility than the first seal member, and
wherein a plurality of elastic members configured to bias the second seal member toward the welding target are provided between the edge section and the second seal member in an extending direction of the second seal member.

2. The movable vacuum welding device according to claim 1, wherein a concave section corresponding to a shape of the welding bead is formed immediately over the welding bead on a surface of the edge section facing the second seal member.

3. The movable vacuum welding device according to claim 1, wherein a modulus of elasticity of the elastic member disposed immediately over the welding bead is reduced.

4. The movable vacuum welding device according to claim 1, wherein the second seal member is a gland packing having a heat-resisting property.

5. A movable vacuum welding device comprising:
a vacuum chamber having an edge section opposite to a surface of a welding target and forming a vacuum space between the surface of the welding target and the vacuum chamber;
a seal section interposed between the edge section and the welding target throughout the entire circumference of the edge section;
a welding head configured to perform welding on the surface of the welding target in the vacuum space;
a moving unit configured to move the welding target with respect to the vacuum chamber; and
a preload unit configured to previously apply a load to the seal section,
wherein the welding target is moved and the vacuum chamber is stationary so that the welding target moves with respect to the vacuum chamber,
wherein the seal section includes:
a first seal member formed of an elastic material and extending along the edge section; and
a second seal member disposed at least a rear side in the relative moving direction in which a welding bead passes, and having higher flexibility than the first seal member, and
wherein the welding head and the vacuum chamber are connected via a movable sealing unit configured to movably support the welding head in a direction perpendicular to the surface of the welding target, and seal a space between the welding head and the vacuum chamber.

6. The movable vacuum welding device according to claim 5, wherein the movable sealing unit is a bellows formed of a metal.

7. The movable vacuum welding device according to claim 5, wherein the welding head is supported by a guide section configured to constantly maintain a distance between the welding head and the welding target with respect to the welding target.

8. The movable vacuum welding device according to claim 2, wherein a modulus of elasticity of the elastic member disposed immediately over the welding bead is reduced.

9. The movable vacuum welding device according to claim 1, wherein the second seal member is a gland packing having a heat-resisting property.

10. The movable vacuum welding device according to claim 2, wherein the second seal member is a gland packing having a heat-resisting property.

11. The movable vacuum welding device according to claim 3, wherein the second seal member is a gland packing having a heat-resisting property.

12. The movable vacuum welding device according to claim 1, wherein the welding head and the vacuum chamber are connected via a movable sealing unit configured to movably support the welding head in a direction perpendicular to the surface of the welding target, and seal a space between the welding head and the vacuum chamber.

13. The movable vacuum welding device according to claim 2, wherein the welding head and the vacuum chamber are connected via a movable sealing unit configured to movably support the welding head in a direction perpendicular to the surface of the welding target, and seal a space between the welding head and the vacuum chamber.

14. The movable vacuum welding device according to claim 3, wherein the welding head and the vacuum chamber are connected via a movable sealing unit configured to movably support the welding head in a direction perpendicular to the surface of the welding target, and seal a space between the welding head and the vacuum chamber.

15. The movable vacuum welding device according to claim 4, wherein the welding head and the vacuum chamber are connected via a movable sealing unit configured to movably support the welding head in a direction perpendicular to the surface of the welding target, and seal a space between the welding head and the vacuum chamber.

16. The movable vacuum welding device according to claim 6, wherein the welding head is supported by a guide section configured to constantly maintain a distance between the welding head and the welding target with respect to the welding target.

* * * * *